United States Patent Office 3,151,158
Patented Sept. 29, 1964

3,151,158
NEW ALKENIC ACID AMIDES AND PROCESS
OF PREPARING THEM
Karl Schmitt, Frankfurt am Main, Ingeborg Hennig, Kelkheim, Taunus, Ernst Lindner, Frankfurt am Main, and Heinrich Ott, Eppstein, Taunus, Germany, assignors to Farbwerke Hoechst Aktiengesellschaft vormals Meister Lucius & Brüning, Frankfurt am Main, Germany, a corporation of Germany
No Drawing. Filed Aug. 4, 1959, Ser. No. 831,475
Claims priority, application Germany, Aug. 8, 1958, F 26,366; July 1, 1959, F 28,821; July 2, 1959, F 28,826
5 Claims. (Cl. 260—562)

The present invention relates to therapeutically valuable, especially narcotically effective $\alpha,\beta$-alkenic acid amides of the general formula

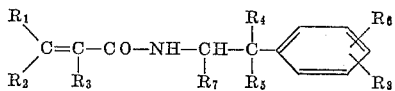

in which $R_1$ represents a straight-chain or branched hydrocarbon radical containing at most 5 carbon atoms, $R_2$ and $R_3$ represent hydrogen, a methyl or ethyl radical, $R_4$ and $R_5$ straight-chain or branched hydrocarbon radicals with at most 4 carbon atoms, $R_7$ stands for hydrogen or a low molecular alkyl group, and $R_6$ and $R_8$ stand for hydrogen atoms, chlorine atoms, hydroxy groups, alkyl groups and/or alkoxy groups with at most 4 carbon atoms.

The present invention relates also to the preparation of such $\alpha,\beta$-alkenic acid amides by reacting amines of the formula

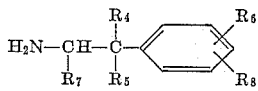

with alkenic acids of the formula

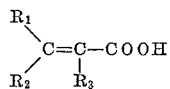

or the reactive derivatives thereof, $R_1-R_8$ having the meanings given above, or by splitting off from the corresponding $\alpha$- or $\beta$-hydroxy-carboxylic acid amides or from the inorganic or organic esters of these compounds water or the acids on which the esters are based, or by eliminating the halogen atoms from the corresponding $\alpha,\beta$-dihalogen-acid amides, or by transforming $\beta,\gamma$-alkenic acid amides into the $\alpha,\beta$-alkenic acid amides.

As amines to be used for the reaction or being present in the form of the aforesaid acid amides to be used as starting substances there may be mentioned:

2-phenyl-2-methyl-butylamine-(1),
2-ortho-, meta- or para-methoxy- or -ethoxy-phenyl-2-methyl-butylamine-(1),
2-phenyl-2-ethyl-butylamine-(1),
2-ortho-, meta- or para-methoxy- or -propoxy-phenyl-2-ethyl-butylamine-(1),
2-phenyl-2-propyl-butylamine-(1),
2-ortho-, meta- or para-methoxy- or butoxy-phenyl-2-propyl-butylamine-(1),
2-phenyl-2-isopropyl-butylamine-(1),
2-ortho-, meta- or para-methoxy- or allyloxy-phenyl-2-isopropyl-butylamine-(1),
2-phenyl-2-butyl-butylamine-(1),
2-ortho-, meta- or para-methoxy- or ethoxy-phenyl-2-butyl-butylamine-(1),
2-phenyl-2-isobutyl-butylamine-(1),
2-ortho-, meta- or para-methoxy- or isobutoxy-phenyl-2-isobutyl-butylamine-(1),
2-phenyl-2-sec.butyl-butylamine-(1),
2-ortho-, meta- or para-methoxy- or ethoxy-phenyl-2-sec.butyl-butylamine-(1),
3-phenyl-3-methyl-pentylamine-(2),
3-ortho-, meta- or para-methoxy- or -ethoxy-phenyl-3-methyl-pentylamine-(2),
3-phenyl-3-ethyl-pentylamine-(2),
3-ortho-, meta- or para-methoxy- or -propoxy-phenyl-3-ethyl-pentylamine-(2),
4-phenyl-4-ethyl-hexyl-amine-(3),
3-ortho-, meta- or para-methoxy- or -butoxy-phenyl-3-propyl-pentylamine-(2),
5-phenyl-5-ethyl-heptylamine-(4),
3-ortho-, meta- or para-methoxy- or allyloxy-phenyl-3-isopropyl-pentylamine-(2),
4-phenyl-4-butyl-hexylamine-(3),
3-ortho-, meta- or para-methoxy- or -ethoxy-phenyl-3-butyl-pentylamine-(2),
4-phenyl-4-isobutyl-hexyl-amine-(3),
3-ortho-, meta- or para-methoxy- or -isobutoxy-phenyl-3-isobutyl-pentylamine-(2),
1-isopropyl-2-phenyl-2-sec.butyl-butylamine-(1),
3-ortho-, meta- or para-methoxy- or ethoxy-phenyl-3-sec.butyl-pentylamine-(2),
2-ortho-, meta- or para-methyl-phenyl-2-ethyl-butyl-amine-(1),
2-ortho-, meta- or para-hydroxy-phenyl-2-ethyl-butyl-amine-(1),
2-(3,4-dimethyl-phenyl)-2-ethyl-butylamine-(1),
2-ortho-, meta- or para-chloro-phenyl-2-ethyl-butyl-amine-(1),
3-para-methyl-phenyl-3-propyl-pentylamine-(2),
3-ortho-, meta- or para-methyl-phenyl-3-ethyl-pentyl-amine-(2),
2-(3,5-dimethyl- or -ethyl-phenyl)-2-ethyl-butylamine-(1),
2-ortho-, meta- or para-methyl- or ethyl-phenyl-2-butyl-butylamine-(1),
2-(3,4-dimethyl-phenyl)-2-sec.butyl-butylamine-(1),
2-para-tert.butyl-phenyl-2-ethyl-butylamine(1),
5-para-isopropyl-phenyl-5-methylheptylamine-(4), in which case -butylamine-(1) may also be replaced by -propylamine-(1), -amylamine-(1) or -hexylamine-(1). It is of particular advantage to use amines in which at least one of the two radicals $R_4$ and $R_5$ stand for an ethyl radical. The said amines can be obtained according to known processes, for example by hydrogenation of the corresponding nitriles or of the ketimines obtainable from respective nitriles by reaction with alkyl-magnesium-halides.

As $\alpha,\beta$-alkenic acids which can advantageously be reacted in the form of reactive derivatives such as halides, anhydrides, esters, azides with the aforementioned amines there may be used: crotonic acid, $\alpha$-methyl-crotonic acid, $\beta$-methyl-crotonic acid, $\alpha,\beta$-dimethyl-crotonic acid, $\alpha$- or $\beta$-ethyl crotonic acid, $\alpha$-methyl-$\beta$-ethyl-crotonic acid, $\beta$- ethyl-α,β-pentenic acid, α-methyl-α,β-isoheptenic acid, β-propyl-crotonic acid, β-sec.butyl-crotonic acid, β-neopentyl-crotonic acid and α,β-alkenic acids with a different combination of the radicals symbolized by $R_1$, $R_2$ and $R_3$. It is of advantage to use β-substituted crotonic acids or the derivatives thereof.

As hydroxy-carboxylic acid amides that can likewise be used as starting substances for the preparation of the desired alkenic acid amides, there are suitable the amides of the α- or β-hydroxy-alkanic acids corresponding to the abovementioned acids and also their esters of organic and inorganic acids, for example α- or β-acyloxy- or -halogeno-alkanic acids. The α- or β-hydroxy-carboxylic acids amides used as starting substances can for example be prepared by reaction of α- or β-hydroxy-carboxylic acid esters with the aforesaid amines.

The α,β-dihalogen-carboxylic acid amides that according to another method of working according to the invention can be transformed into the desired unsaturated amides by elimination of halogen are based on the abovementioned acids, the double bond, however, being saturated by 2 halogen atoms, preferably chlorine or bromine. The α,β-dihalogen carboxylic acid amides can for example be prepared in known manner by reaction of the α,β-dihalogen carboxylic acid halides with the above-mentioned amines.

As β,γ-alkenic amides that can be transformed into α,β-alkenic acid amides by displacement of the double bond there may be used the amides of such alkenic acids as differ from the aforementioned acids by the β,γ-position of the double bond.

The reaction of the alkenic acids or their reactive derivatives with the respective amines proceeds in known manner. It is advantageous to use the acid chlorides that are easily accessible from acids, for example by means of thionyl chloride, which are caused to act upon the amine at a low or slightly raised temperature. In most cases the reaction proceeds without additional supply of heat, often even while cooling with ice at temperatures between 0 and 10° C. However, the reaction may also be carried out at higher temperatures. The reaction can be carried out in the presence or absence of a solvent. As solvents there are particular suitable: ethers such as diethyl-, diisopropyl- or dibutyl-ether, tetrahydrofurane, dioxane; liquid ketones such as acetone, methyl-ethyl-ketone; hydrocarbons such as petroleum ether, benzene, toluene, and dimethyl-formamide. For binding of the hydrogen chloride set free during the reaction there may be used an amine in excess or a tertiary amine such as trimethylamine, triethylamine, dimethylaniline, pyridine—possibly also simultaneously acting as solvent—or an alkali metal or alkaline earth metal hydroxyde or carbonate. Finally, the reaction may also be carried out in an aqueous suspension in the presence of alkali or alkaline earth. The reaction products are isolated in the usual manner and purified either by crystallization or distillation.

If, according to another method of executing the process of the invention, amides of the respective hydroxy-alkanic acids or their esters are used as starting substances, the desired alkenic acid amides are obtained by elimination of water or acid. The method is likewise known in principle. The reaction can be carried out, for example, by heating in the presence or absence of a solvent and of an acid or basic agent. In some cases this reaction takes place during the distillation so that the desired α,β-alkenic acid amide is directly obtained as distillate. In the case of α-halogen acid amides, for example, boiling for several hours in diethylaniline or similar organic bases has proved to be of particular advantage. In other cases, for example when using some β-bromo-alkanic acid amides, the elimination of hydrogen bromide and thus the introduction of the double bond is already achieved upon prolonged standing in the presence of an organic base, for example diethylamine.

The introduction of the double bond into α,β-dihalogen-alkanic acid amides by elimination of the halogen is likewise a method known per se. To this purpose it is of advantage to react in the boiling heat the halogen compound with metallic zinc in the form of a powder or shavings in a solvent from the group of ethers or alcohols. In some cases, particularly when starting from dibromo-acid amides, the elimination of halogen can also be achieved by boiling with sodium iodide in alcohol or acetone.

The transformation of β,γ-alkenic acid amides into the desired α,β-alkenic acid amides is effected in known manner, generally by heating with alkali, with a particularly good result in those cases in which the α,β-alkenic acid amide can be isolated from the reaction mixture in crystalline form.

The products of the present invention are valuable medicaments. They are distinguished by useful therapeutic properties and a very low toxicity. Depending on the dose administered, they may be used as very good sedatives, hypnotics or narcotics.

In order to test the products of the present invention for their narcotic action, mice were given an intravenous injection of 2.5–10 mg./kg. of the products of the invention in the form of a solution of 0.1–1% strength in a 100% propylene glycol. When administering 3 mg./kg. of β-methyl-crotonic acid-[2-ethyl-2-phenyl-butyl-(1)]-amide the treated mice were narcotized and remained quietly on their backs. When the aforementioned dose was administered the narcosis lasted for about 15 minutes. When 10 mg./kg. were injected the narcosis lasted for about 30 minutes. When rats were used as test animals, an intravenous injection of 3 mg./kg. of the said compound produced a narcosis lasting for about 10 minutes, during which time the animals could be turned on their backs and remained in that position. When 10 mg./kg. were administered, the narcosis was prolonged also in the case of rats, and lasted for about 30 minutes. The same effects were achieved with dogs, in which case an intravenous injection of a 2.5% solution in a 100% propylene glycol administered in a dose of 3 mg./kg. produced a deep and quiet narcosis which started about 1 minute after the injection. During the narcosis, the postural reflexes ceased but the corneal reflexes could still be elicited, and the animals remained on their backs. The greatest depth of narcosis lasted for about 15 to 20 minutes. One hour after the injection the dogs were again running about. Of special importance is the fact that the dogs fell asleep and woke up without any excitation. A dose of 2 mg./kg. injected intravenously did not suffice for all dogs and for the rest only produced a light narcosis. When mice were used as test animals, an intravenous injection of 2.5–5 mg./kg. of β-methyl-crotonic acid-[3-phenyl-3-ethyl-pently-(2)]-amide in the form of a 0.5% solution in a 100% propylene glycol produced a narcosis during which the mice remained on their backs. When administering the afore-mentioned dose, the narcosis lasted for a period up to about 6 minutes. When 10 mg./kg. were injected, the narcosis lasted for about 15 minutes. When using rats as test animals, the intravenous injection of 5 mg./kg. of the said compound produced a narcosis lasting for about 4 minutes. 10 mg./kg. also produced a prolonged effect in the case of rats. The narcosis lasted for about 15 minutes, whereas 25 mg./kg. produced a narcosis lasting for 30 minutes.

When injecting intravenously 2.5 mg./kg. of β-methyl-crotonic acid-[2-ethyl-2-(para-tolyl)-butyl-(1)]-amide in the form of a 1% solution in a 100% propylene glycol, the treated mice were likewise narcotized and remained quietly on their backs. When administering the aforementioned dose the narcosis lasted for about 15 minutes. When rats were used as test animals, the intravenous injection of 2.5 mg./kg. of the said compound produced a narcosis lasting for 6–20 minutes, during which time the animals could be turned on their backs and remained in that position. The same effects were achieved with dogs, in which case an intravenous injection of 1.5 mg./kg. in a 100% propylene glycol produced a narcosis which started 1 minute after the injection. During the narcosis, the postural reflexes ceased but the corneal reflex could still be elicited, and the animals remained on their backs. The greatest depth of narcosis lasted for about 15 to 20 minutes. One hour after the injection the dogs were again running about.

Of special advantage in the use of the products as medicaments is their relatively low toxicity. When intravenously injecting β-methyl-crotonic acid-[2-ethyl-2-phenyl-butyl-(1)]-amide, the lethal dose in the rat amounts to 30 mg./kg. In the mouse the lethal dose likewise amounts to 30 mg./kg. after intravenous injection of a 1% solution. When β-methyl-crotonic acid-[3-phenyl-3-ethyl-pentyl-(2)]-amide is injected intravenously the lethal dose amounts to 37.5 mg./kg. in the rat. In the mouse the lethal dose amounts to 20 mg./kg. when β-methyl-crotonic acid-[2-ethyl-2-(para-tolyl)-butyl-(1)]-amide is injected intravenously. The strong narcotic effect of the products of the invention is surprising insofar as, for example, the known crotonic acid diethylamide obtainable according to Beilstein, 4, II, page 605, exhibits neither an analgesic nor a narcotic action when administered subcutaneously in a dose of 250 mg./kg.

The following examples serve to illustrate the invention, but they are not intended to limit it thereto:

Example 1

A solution of 17.7 grams of 2-ethyl-2-phenyl-butylamine-(1) and 16 cc. of triethylamine in 100 cc. of ether is added dropwise, while stirring and cooling with ice, to a solution of 12 grams of β-methyl-crotonic acid chloride in 100 cc. of ether. The mixture is stirred for 30 minutes at room temperature, triethylamine hydrochloride is filtered off with suction and thoroughly washed with ether. The filtrate is evaporated. β-Methyl-crotonic acid-[2-ethyl-2-phenyl-butyl-(1)]-amide is obtained in the form of an oil (22.5 grams) that crystallizes upon inoculation. After recrystallization from aqueous methanol it melts at 88–90° C.

The same compound is obtained if 2-ethyl-2-phenyl-butylamine-(1) is admixed with an excess of dilute aqueous sodium hydroxide solution and β-methyl-crotonic acid chloride is added dropwise while stirring vigorously and cooling with ice.

In analogous manner there is obtained from β-methyl-crotonic-acid chloride or ethyl ester and from 2-ethyl-2-(meta-methoxy-phenyl)-butylamine-(1) β-methyl-crotonic acid - [2-ethyl-2-(meta-methoxy-phenyl)-butyl-(1)]-amide melting at 68–70° C., furthermore from crotonic acid chloride and from 2-ethyl-2-phenyl-butylamine-(1) crotonic acid - [2 - ethyl-2-phenyl-butyl-(1)]-amide that melts at 65–67° C. after recrystallization from petroleum ether, and from cis-β-neopentyl-crotonic acid chloride and 2-ethyl-2-phenyl-butylamine-(1) cis-β-neopentyl-crotonic acid-[2-ethyl-2-phenyl-butyl-(1)]-amide that melts at 66–68° C.

Example 2

By refluxing β-methyl-crotonic acid ethyl ester with 2-ethyl-2-phenyl-butylamine-(1) for about 10 hours in the heating bath at 150–170° C. and by distilling off unchanged starting material under reduced pressure there is obtained an oily residue from which the β-methyl-crotonic acid-[2-ethyl-2-phenyl-butyl-(1)]-amide crystallizes upon inoculation. After recrystallization from aqueous alcohol the product melts at 88–90° C.

Example 3

To a solution of 17.5 grams of trans-β-neopentyl-crotonic acid chloride in ether there is added dropwise, while stirring and cooling with ice, an ether solution of 17.7 grams of 2-ethyl-2-phenyl-butylamine-(1). The reaction mixture is stirred until the smell of the acid chloride has disappeared. The crystallisate is filtered off with suction and treated with water, the trans-β-neopentyl-crotonic acid-[2-ethyl-2-phenyl-butyl-(1)]-amide remaining undissolved (28 grams). After recrystallization from ethyl acetate the melting point amounts to 117–118° C.

Example 4

To 62 grams of 2-(m-methoxy-phenyl)-2-ethyl-butylamine-(1) in 50 cc. of ether there are added dropwise, while stirring and cooling with ice, 15.5 grams of crotonic acid chloride in 250 cc. of ether. After stirring for a short time, the ether is distilled off to a large extent under reduced pressure whereupon a white crystalline magma is formed. After addition of water there are obtained two clear layers that are separated. After washing of the ether solution with sodium bicarbonate and water the ether is dried and distilled off. There are obtained 33 grams of crotonic acid-[2-ethyl-2-(meta-methoxy-phenyl)-butyl(1)]-amide boiling at 155–160° C. under a pressure of 0.07 mm. of mercury. The compound crystallizes upon inoculation. It melts at 65–67° C.

In analogous manner there is obtained from 2-phenyl-2-ethyl-butyl-(1)-amine and from tiglic acid chloride the tiglic acid-[2-ethyl-2-phenyl-butyl-(1)]-amide boiling at 134–136° C. under a pressure of 0.15 mm. of mercury and from 2-ethyl-hexene-(2)-acid chloride and 2-ethyl-2-(meta-methoxy-phenyl)-butyl-(1)-amine the 2-ethyl-hexenic - (2) - acid - [2-ethyl-2-(meta-methoxy-phenyl)-butyl-(1)]-amide boiling at 155–160° C. under a pressure of 0.05 mm. of mercury. (Since the 2-ethyl-hexenic-(2)-acid was prepared from 2-bromo-2-ethyl-hexanic acid by elimination of hydrogen bromide, it is possible that part of the 2-ethyl-hexenic-(2)-acid derivative is present in the form of the isomeric 2-butyl-crotonic acid derivative.)

Example 5

A solution of 19.3 grams of 3-ethyl-3-phenyl-pentylamine-(2) and 16 cc. of triethylamine in 100 cc. of ether is added dropwise, while cooling with ice, to a solution of 12 grams of β-methyl-crotonic acid chloride in 300 cc. of ether. The reaction mixture is stirred for one hour at room temperature, the triethylamine hydrochloride is filtered off with suction, and, after evaporation of the ether solution, there are obtained 27 grams of β-methyl-crotonic acid-[3-ethyl-3-phenyl-pentyl-(2)]-amide that melts at 97–99° C. after recrystallization from cyclohexane.

Example 6

26 grams of β-methyl-crotonic acid chloride are gradually added, while stirring and cooling with ice, to a solution of 38.6 grams of 2-ethyl-2-(meta-hydroxy-phenyl)-butylamine-(1) in 350 cc. of pyridine. The reaction mixture is poured on ice and β-methyl-crotonic acid-[2-ethyl-2-(meta-hydroxy-phenyl)-butyl-(1)]-amide is obtained in the form of an oil that crystallizes upon inoculation (54 grams). After recrystallization from ethyl acetate, the product melts at 138–140° C.

In analogous manner β-methyl-crotonic acid chloride is reacted with 2-ethyl-2-(para-hydroxy-phenyl)-butylamine-(1) to form the β-methyl-crotonic acid-[2-ethyl-2-(para-hydroxy-phenyl)-butyl-(1)]-amide melting at 192–194° C.

Example 7

To a solution of 7.5 grams of β-methyl-crotonic acid chloride in 60 cc. of ether there is added dropwise, while stirring and cooling with ice, a mixture of 12 grams of 2-ethyl-2-(p-methyl-phenyl)-butylamine-(1), 60 cc. of ether and 9.2 cc. of triethylamine. The reaction mixture is stirred for one hour at room temperature, the triethylamine hydrochloride is filtered off with suction, the ether is evaporated and the β-methyl-crotonic acid-[2-ethyl-2-(p-methyl-phenyl)-butyl-(1)]-amide is obtained in the form of an oil (17 grams) that solidifies to crystals melting at 86-88° C. upon inoculation and trituration with petroleum ether.

In analogous manner there is obtained from β-methyl-crotonic acid chloride and from 2-ethyl-2-(3.4-dimethyl-phenyl)-butylamine-(1) the β-methyl-crotonic acid-[2-ethyl-2-(3.4-dimethyl - phenyl)-butyl-(1)]-amide melting at 62-64° C. and from β-methyl-crotonic acid chloride and 2-ethyl-2-(meta-chloro-phenyl)-butylamine-(1) the β-methyl-crotonic acid-[2-ethyl-2-(meta - chlorophenyl)-butyl-(1)]-amide that melts at 84-86° C. after recrystallization from dibutyl ether.

We claim:
1. The compound of the formula

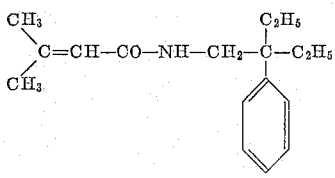

2. The compound of the formula

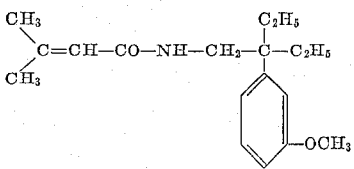

3. The compound of the formula

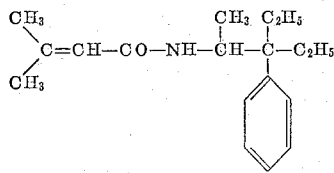

4. The compound of the formula

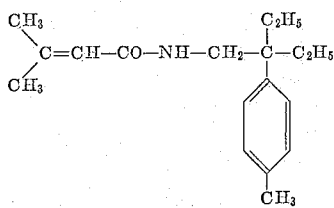

5. The compound of the formula

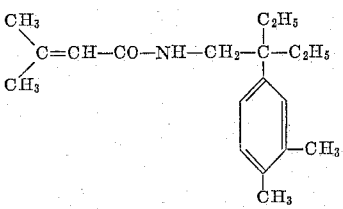

References Cited in the file of this patent
UNITED STATES PATENTS

| | | |
|---|---|---|
| 2,505,681 | Martin et al. | Apr. 25, 1950 |
| 2,505,682 | Martin et al. | Apr. 25, 1950 |
| 2,541,930 | Martin et al. | Feb. 13, 1951 |
| 2,773,063 | Specht et al. | Dec. 4, 1956 |